United States Patent
Harju et al.

(10) Patent No.: US 8,934,928 B2
(45) Date of Patent: Jan. 13, 2015

(54) MATCH MAKER SERVICE

(75) Inventors: Teemu Harju, Espoo (FI); Uwe Schwarz, Veikkola (DE); Manish Varma, Gurgaon (IN); Matti I. Vesterinen, Espoo (FI); Timo Alakoski, Helsinki (FI)

(73) Assignee: Nokia Solutions and Networks Oy, Espoo (FI)

( * ) Notice: Subject to any disclaimer, the term of this patent is extended or adjusted under 35 U.S.C. 154(b) by 1103 days.

(21) Appl. No.: 12/230,011

(22) Filed: Aug. 21, 2008

(65) Prior Publication Data

US 2010/0048228 A1  Feb. 25, 2010

(51) Int. Cl.
*H04W 4/14* (2009.01)
*H04L 29/08* (2006.01)

(52) U.S. Cl.
CPC ............ *H04L 67/306* (2013.01); *H04W 4/14* (2013.01); *H04L 67/02* (2013.01)
USPC ........................... 455/466; 455/403; 455/440

(58) Field of Classification Search
CPC ............ G06F 17/30643; G06Q 10/10; H04M 1/72583; H04W 4/14
USPC ........ 455/466, 403, 456.1–456.3, 425, 422.1, 455/440; 370/328
See application file for complete search history.

(56) References Cited

U.S. PATENT DOCUMENTS

| | | | |
|---|---|---|---|
| 6,961,330 B1 * | 11/2005 | Cattan et al. | 370/352 |
| 2002/0037722 A1 | 3/2002 | Hussain et al. | |
| 2004/0230897 A1 * | 11/2004 | Latzel | 715/513 |
| 2007/0027897 A1 * | 2/2007 | Bremer et al. | 707/102 |
| 2007/0194123 A1 * | 8/2007 | Frantz et al. | 235/462.45 |
| 2007/0214024 A1 * | 9/2007 | Jain et al. | 705/5 |
| 2008/0177662 A1 * | 7/2008 | Smith et al. | 705/44 |
| 2009/0061828 A1 * | 3/2009 | Sigmund et al. | 455/413 |
| 2009/0227229 A1 * | 9/2009 | Waller | 455/406 |
| 2009/0275307 A1 * | 11/2009 | Kahn | 455/404.1 |

FOREIGN PATENT DOCUMENTS

EP   1 603 058 A1   12/2005

OTHER PUBLICATIONS

Global System for Mobile Communications, "Digital Cellular Telecommunications System (Phase 2+); Universal Mobile Telecommunications System (UMTS); Unstructured Supplementary Service Data (USSD); Stage 1 (3GPP TS 22.090 version 7.0.0 Release 7)", ETSI TS 122 090 V7.0.0, Jun. 2006, pp. 1-11.

* cited by examiner

*Primary Examiner* — Chuong A Ngo
(74) *Attorney, Agent, or Firm* — Squire Patton Boggs (US) LLP (57) ABSTRACT

Embodiments of the invention are directed to methods, apparatuses and systems for providing a service, utilizing Unstructured Supplementary Service Data (USSD), to a user in a communications network. According to one example of the invention, a hypertext transfer protocol (HTTP) message is received from an unstructured supplementary service data (USSD) server or gateway. Relevant content is then retrieved from a database upon receiving the HTTP message. A USSD message content is created based on a set of parameters, the USSD message content is sent to the USSD server, and the relevant content may then be provided to a user terminal in a text message.

28 Claims, 10 Drawing Sheets

Fig. 1

Fig.2A
User details:

| User ID | Languages | Locations | ... |
|---------|-----------|-----------|-----|
| User 1  | Langs 1   | Locs 12   |     |
| User 2  | Langs 2   | Locs 20   |     |
| User 3  | Langs 2   | Locs 4    |     |
| User 4  | Langs 5   | Locs 2    |     |

Fig.2B
User information (basic info on users):

| User ID | Phone no | ... |
|---------|----------|-----|
| User 1  | 1234...  |     |
| User 2  | 1234...  |     |
| User 3  | 1234...  |     |
| User 4  | 1234...  |     |

Languages table:

| Languages | Language ID |
|-----------|-------------|
| Langs 1   | Lang 1      |
| Langs 2   | Lang 1      |
| Langs 2   | Lang 2      |
| Langs 3   | Lang 2      |

Language table:

| Language ID | Language |
|-------------|----------|
| Lang 1      | Hindi    |
| Lang 2      | Kannada  |
| Lang 3      | English  |
| ...         | ...      |

Fig.10

MATCH MAKER SERVICE

BACKGROUND OF THE INVENTION

1. Field of the Invention

Embodiments of the invention relate to communications networks and particularly to wireless communication networks, such as the global system for mobile communications (GSM) and the universal mobile telecommunications system (UMTS). More specifically, certain embodiments of the invention are directed to methods, apparatuses and systems for providing a service, utilizing unstructured supplementary service data (USSD), to a user in a communications network.

2. Description of the Related Art

Unstructured supplementary service data (USSD) is a third generation partnership project (3GPP) protocol used to deliver menu-based services for mobile phones. USSD is essentially a capability of all GSM phones on the market. USSD is generally associated with real-time or instant messaging type phone services.

USSD is typically used as a 'trigger' to invoke independent calling services which do not require the overhead and additional usage costs of a short message service center (SMSC), such as a callback service, or interactive menuing service.

USSD is a standard for transmitting information over GSM signaling channels. It may be used, for example, as a method to query the available balance and other similar information in pre-paid GSM services. The function that is triggered when sending USSD is network dependent and depends on what kind of services the operator has made available.

Typically, USSD services work such that a mobile phone dials a service specific code that is directed via the USSD center (USSDC) to a USSD browser application that generates, for instance, a menu that it sends back to the mobile phone.

USSD is an important protocol for reaching the next billion people with internet-like services. Today, there are 1.2 billion internet users and over 3 billion phone users globally. As a result, almost 2 billion people currently could benefit from simple text based data services more powerfully if they were build in an internet-like manner. In view of the above, the present invention facilitates the use of USSD as a bearer for Internet-like services.

SUMMARY OF THE INVENTION

In accordance with an embodiment of the present invention, there is provided a method, including receiving a hypertext transfer protocol (HTTP) message from an unstructured supplementary service data (USSD) gateway or server, and retrieving relevant content from a database upon receiving the HTTP message. The method further includes creating a USSD message content based on a set of parameters, sending the USSD message content to the USSD gateway or server, and, optionally, providing the relevant content to a user terminal in a text message.

In accordance with an embodiment of the present invention, there is also provided an apparatus, including a receiver configured to receive a hypertext transfer protocol (HTTP) message from an unstructured supplementary service data (USSD) gateway or server. The apparatus also includes a processor configured to retrieve relevant content from a database upon receiving the HTTP message, and to create an USSD message content based on a set of parameters. The apparatus further includes a transmitter configured to send the USSD message content to the USSD gateway or server, and, optionally, to provide the relevant content to a user terminal in a text message.

In accordance with another embodiment of the present invention, there is also provided a method, including receiving an unstructured supplementary service data (USSD) request for content from a user of a USSD gateway or server, transforming the USSD request to a hypertext transfer protocol (HTTP) request, and indicating the service menu path the user has taken in a uniform resource identifier (URI) of the HTTP request.

In accordance with an embodiment of the present invention, there is also provided an apparatus, including a receiver configured to receive an unstructured supplementary service data (USSD) request for content from a user of a USSD gateway or server, a processor configured to transform the USSD request to a hypertext transfer protocol (HTTP) request, and an indicating unit configured to indicate the service menu path the user has taken in a uniform resource identifier (URI) of the HTTP request.

In accordance with an embodiment of the present invention, there is also provided an apparatus, including receiving means for receiving a hypertext transfer protocol (HTTP) message from an unstructured supplementary service data (USSD) gateway or server, retrieving means for retrieving relevant content from a database upon receiving the HTTP message, creating means for creating a USSD message content based on a set of parameters, sending means for sending the USSD message content to the USSD gateway or server, and, optionally, providing means for providing the relevant content to a user terminal in a text message.

In accordance with another embodiment of the present invention, there is also provided an apparatus, including receiving means for receiving an unstructured supplementary service data (USSD) request for content from a user of a USSD gateway or server, transforming means for transforming the USSD request to a hypertext transfer protocol (HTTP) request, and indicating means for indicating the service menu path the user has taken in a uniform resource identifier (URI) of the HTTP request.

In accordance with an embodiment of the present invention, there is further provided a computer program, embodied on a computer readable medium. The computer program is configured to control a processor to perform at least the methods outlined above.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

The unstructured supplementary services data (USSD) standard in the global system for mobile communications (GSM) and the universal mobile telecommunications system (UMTS) is used for enabling information exchange between a user device and network elements over a signaling session. USSD is supported by all standard GSM phase 2 compatible terminals, and many network elements such as intelligent network (IN) systems, operator specific menu browser systems, and the USSD gateway system (also known as USSD center).

Generally, embodiments of the invention may be directed to a service architecture and implementation for connecting a user seeking a certain service or good with providers of those services or goods. In one example, the user browses through a logically tree-structured database of goods and services being offered. Once the user finds what they are looking for, the user is provided with information regarding those goods or services and the contact information of the provider of choice. This information may be delivered to the browsing user as a text message.

Figure 1:
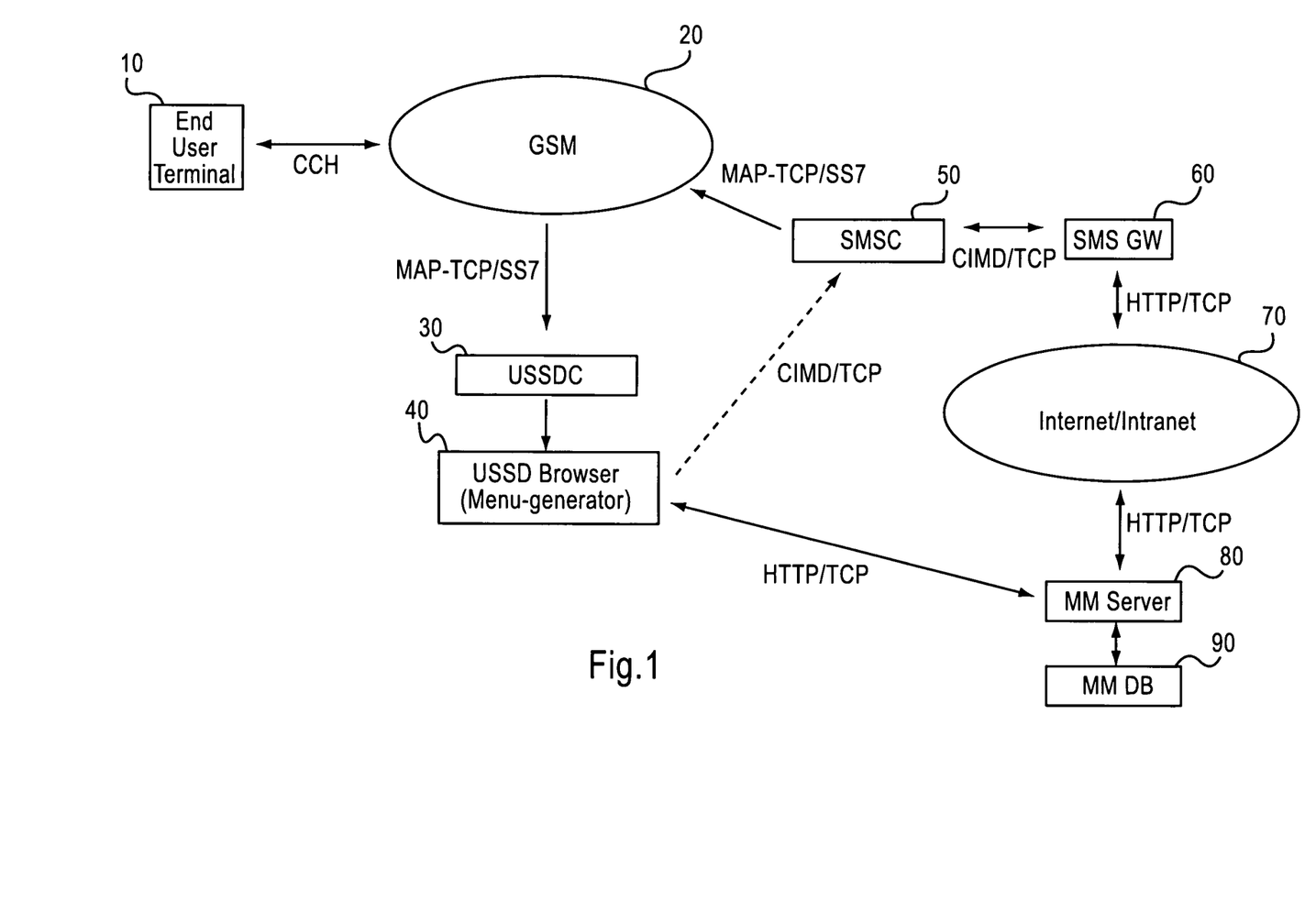
FIG. 1 illustrates a system according to one embodiment of the invention.

As illustrated in FIG. 1, one example of the invention is directed to a system for providing information regarding goods and services to a user. The system includes a USSD browser 40 communicating with a USSD center 30 (USSDC) and a MatchMaker server 80 (MM Server). The USSD browser 40 receives USSD messages from the USSDC 30 and passes them to the MM server 80 using hypertext transfer protocol (HTTP). The body of an HTTP response is sent back to the user terminal 10 as a USSD message. Depending on the capabilities of the USSD browser 40, it may also have a connection to the short message service center 50 (SMSC) or there may be a connection between the MM server 80 and the short message service gateway 60 (SMS GW). This connection may be used to send the final content to the user in an SMS message, via GSM 20 for example, after the USSD session has ended.

The MM server 80 may be a web server, such as Apache/PHP, and may comprise a database containing the MM content (MM DB 90). The MM Server 80 receives HTTP messages from the USSD browser 40 and creates USSD message content based on the end user mobile subscriber integrated services digital network number (MSISDN), type of USSD request, end user answer, USSD session ID along with additional parameters, such as user language and location. These additional parameters may be user specific and may be stored in the database MM DB 90. The USSD message content may then be sent to the USSD browser 40 in the HTTP response body.

The SMS GW 60 is the network element which performs messaging between the MM server 80 and the user terminal 10. In one embodiment of the invention, the SMS GW 60 is connected to the MM server 80 via the Internet/Intranet 70, and communicate using HTTP messages. The SMS GW 60 is able to receive HTTP messages and act accordingly by sending the content in the received HTTP message to the MSISDN number stated in the HTTP message. The SMS GW 60 may also be able to send HTTP messages in the other direction, namely towards the MM server 80. The SMS GW 60 functionality may include formatting the final response text in an SMS-suitable format and sending it to the user via an SMSC 50. In an example of the invention, the functionality of the SMS GW may even be incorporated within the MM server 80.

The MM server 80 may also store user information to the MM DB 90. The user information may include, for instance, name, language, contact, category and location information to relevant detail (country, city, area etc). Embodiments of the invention also provide different ways to input the user information to the system. In one example, the MM server 80 may have a web interface to input the user information to the MM DB 90. More specifically, there may be two different input views, one for administrators and another for the users. Alternatively, the information may be uploaded through a USSD menu choice, such as language, category, or location information to relevant detail (country, city, area etc), or if actual text input through a USSD session is available then name and contact details would be relevant. In another example, the information may be uploaded through SMS, where the SMS GW 60 forwards the message to the MM server 80. In addition, it may be possible to extract information from other systems that expose open application program interfaces (APIs), such as location servers or other profile systems within the network At least two use cases may be provided relating to upload through a USSD menu choice: 1. The user would have a choice on the first USSD menu level, and possibly on all the levels, to edit their user information; or 2. if an end user connects to the MM server 80 using USSD for the first time, the MM server 80 may ask the user to define some information about themselves. This kind of user information is, for instance, language, category, and location information to relevant detail (country, city, area etc). If text input through USSD is available to the user, then name and contact details would also be relevant. Some of these details, such as location, may be retrievable from the mobile operator. Consequently, the MM server 80 may be configured in such a way that it would be possible to connect to an operator network if needed. In particular, the MM server 80 may need to connect to the operator location server (not shown) in order to fetch the end user location during a user USSD session.

Figure 2A:
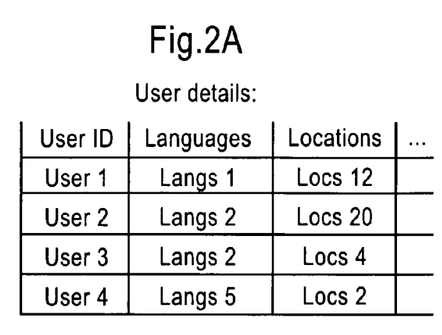
FIGS. 2A-2D illustrate examples of user details and detail tables, according to one example of the invention.
Figure 2B:
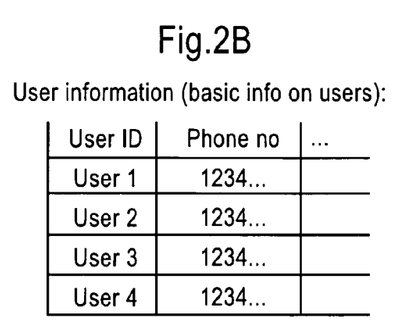
Figure 2C:
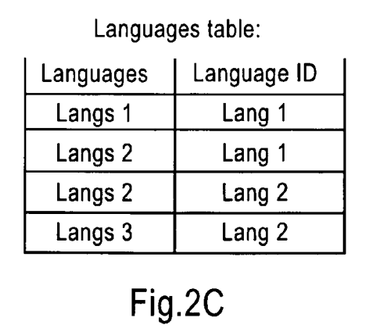
Figure 2D:
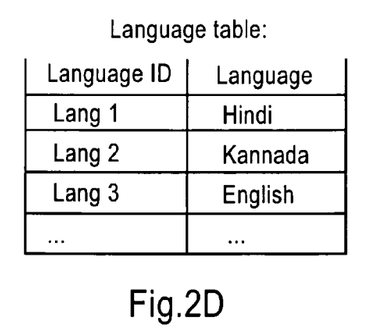

FIGS. 2A-2D illustrate examples of user details and detail tables, according to one example of the invention. Each user ID may be associated with user details, such as languages and locations, as shown in FIG. 2A. User information, such as phone numbers, may also be stored as illustrated in FIG. 2B. Additionally, users should be able to choose several options for one detail, like language, as shown in FIGS. 2C and 2D.

Referring again to FIG. 1, the MM server 80 is also able to remember the session ID and create USSD responses for the end user terminal 10 based on the end user's answers taking into account the user information stored in the MM server 80. The USSD menus may be fairly static or very dynamic. When the MM server 80 receives an HTTP message from the USSD Browser 40 it should fetch the relevant content from the MM DB 90 and send it in the HTTP message body to the USSD browser 40.

Figure 3:
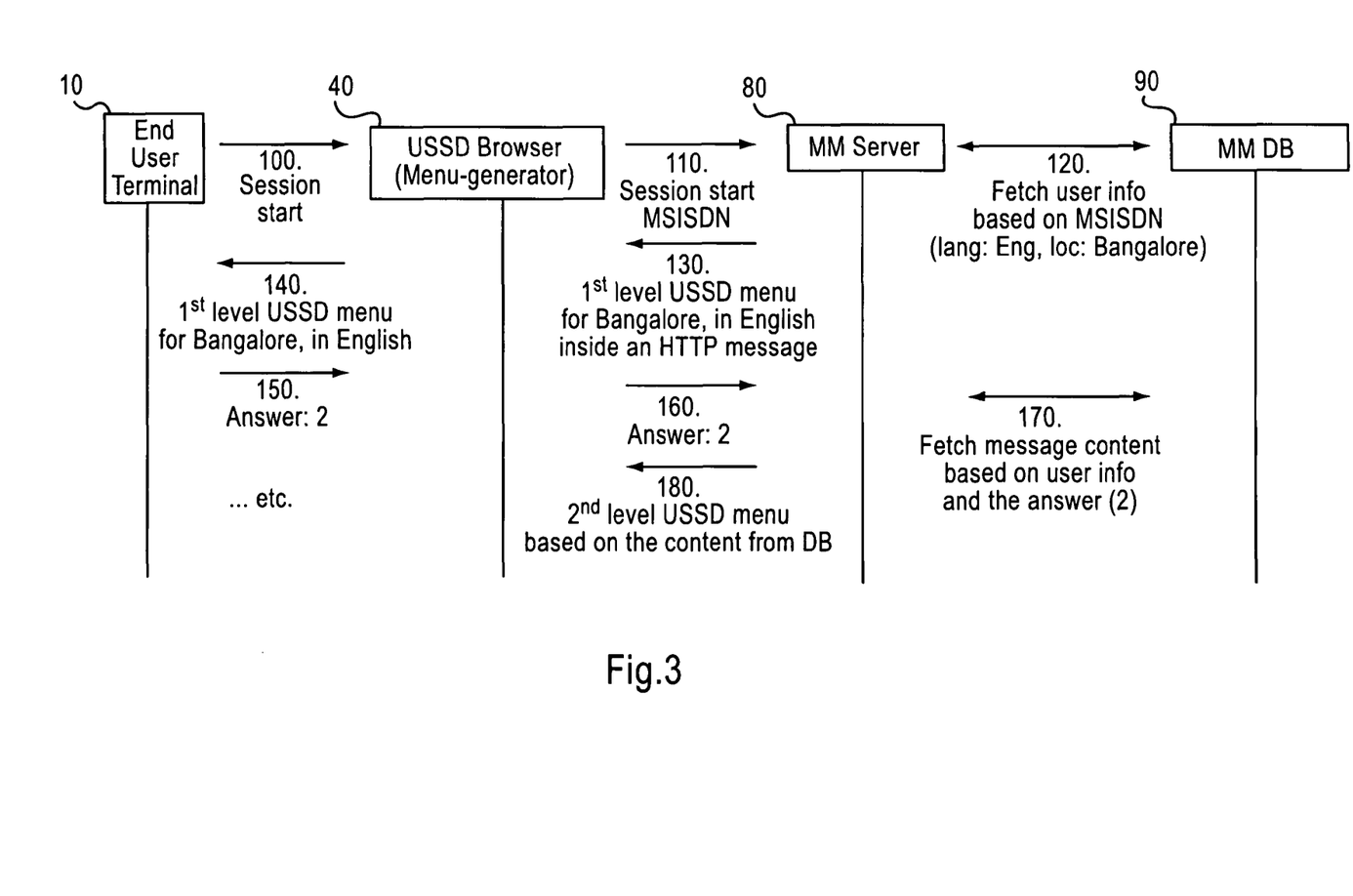
FIG. 3 illustrates a signaling diagram according to one embodiment of the invention.

FIG. 3 illustrates a signaling diagram according to one example of the invention. The end user terminal 10 indicates a session start request 100 to the USSD browser 40. The USSD browser 40 forwards the request and MSISDN 110 to the MM server 80. The MM server 80 then fetches the user information based on the MSISDN 120 from the MM DB 90. A first level USSD menu based on the user information is then returned 130 to the USSD browser 40 inside an HTTP message and provided 140 to the end user terminal 10. The end user terminal 10 then provides an answer 150 to the menu choices, which is then forwarded 160 from the USSD browser 40 to the MM server 80. The MM server 80 fetches 170 message content from the MM DB 90 based on the user information and the answer provided by the user. A second level USSD menu may then be provided 180 based on the message content fetched from the MM DB 90.

Figure 4:
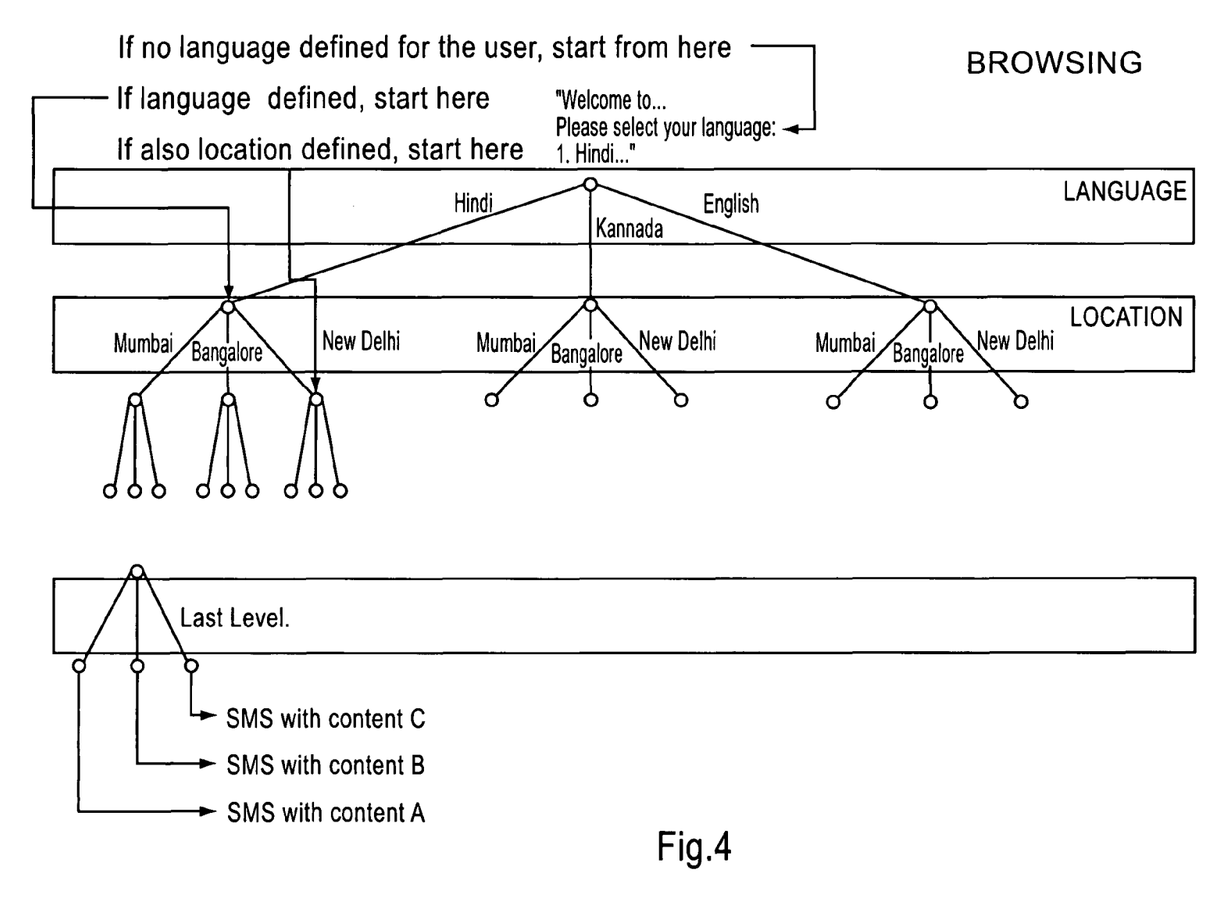
FIG. 4 illustrates an example of a tree structure for storage of information in accordance with an embodiment of the invention.

Furthermore, embodiments of the invention provide a method for providing a tree structure for hierarchical presentation of data, facilitating easy browsing of the contents as menus created by the USSD browser and displayed on the terminal display. FIG. 4 illustrates a tree structure for browsing through menu information, according to one example of the invention. First, a user may define a language 1 at the first level. Next, a location for the user may be specified. Trees can differ based on language and location, and may include x number of configurable levels. At any level of the tree structure, the user has a menu option for changing user settings, which will take the user back to the first level.

Once the user chooses the last item on the last level of the tree structure and, thereby, reaches the end of the USSD session, an SMS message may be delivered to the end user terminal 10 containing the selected content. In some cases, however, SMS delivery may not be needed. According to one embodiment of the invention, the MM server 80 may request that the SMS GW 60 send the selected content to a given MSISDN.

Figure 5:
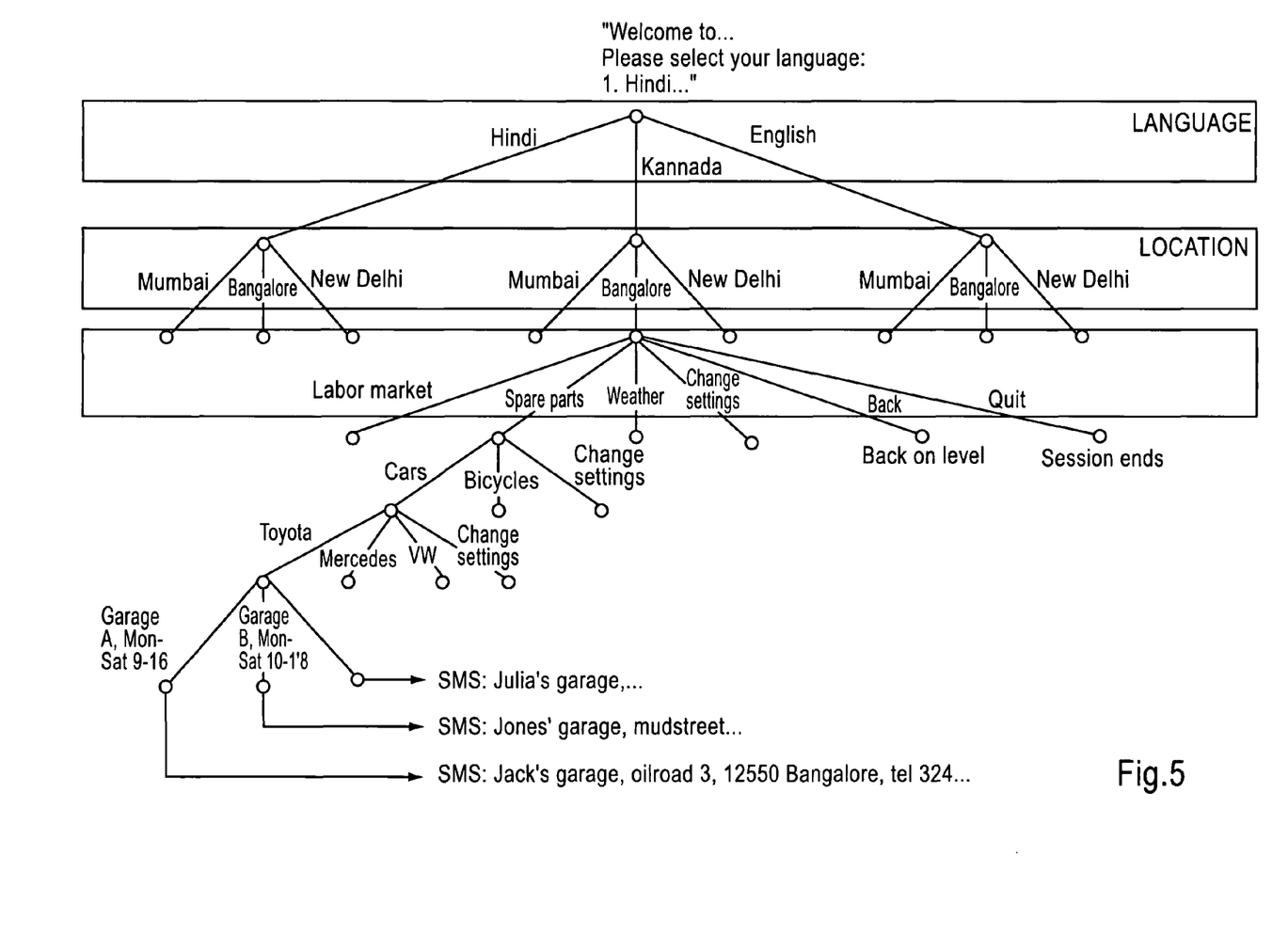
FIG. 5 illustrates an example of a tree structure for storage of information in accordance with another embodiment of the invention.

FIG. 5 illustrates an example of what kind of content might be presented in the menus and what type of information a user may be provided via SMS. In one embodiment, the last USSD menu level would only display part of the information to the user, requiring the user to select SMS delivery in order to receive the complete information. The amount of information revealed in the USSD menus (name, address, telephone number, etc.) may depend upon the service.

Figure 6:
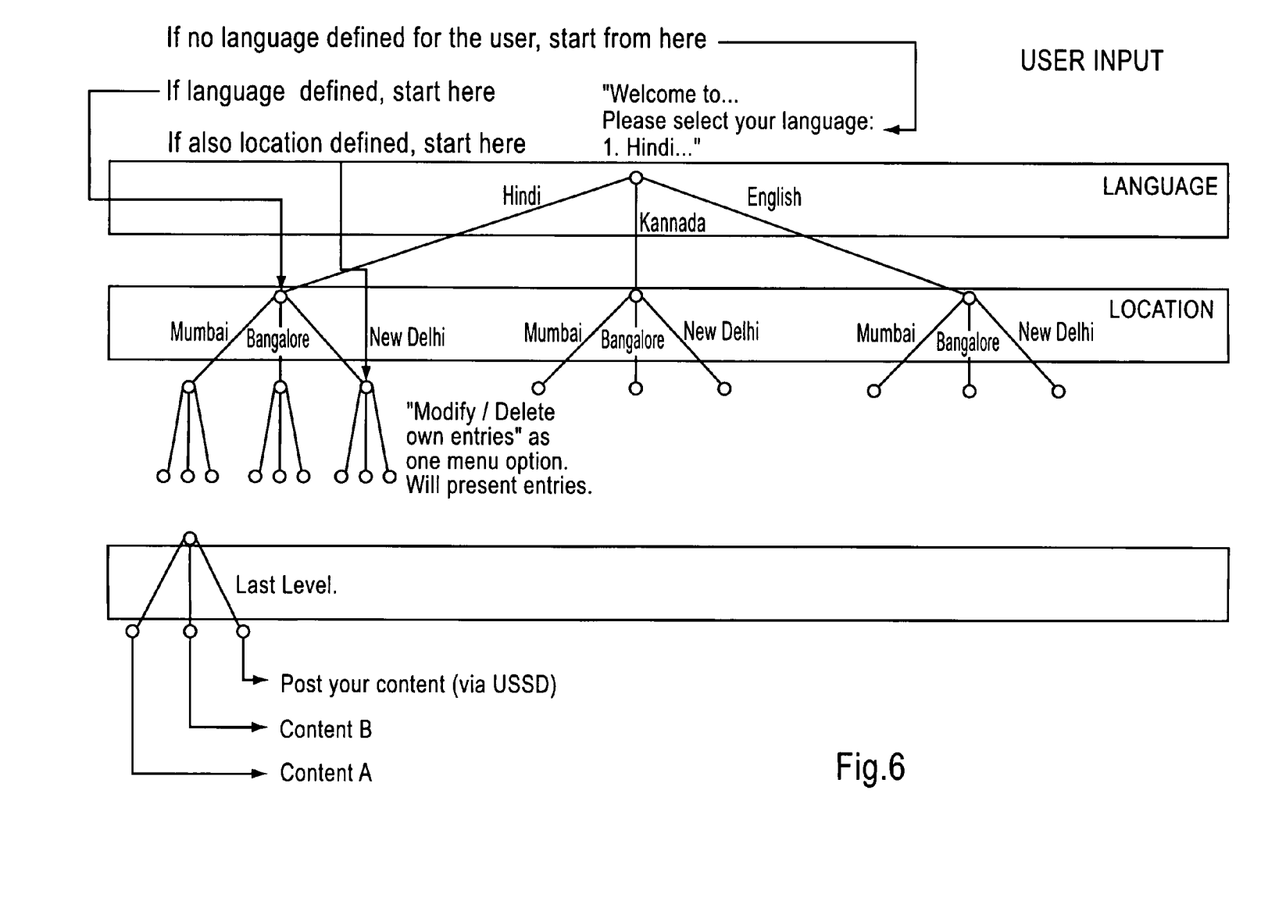
FIG. 6 illustrates an example of a tree structure for storage of information in accordance with another embodiment of the invention.

Similar to the user information input, there may be different alternatives for inputting new content to the MM service. In one example, the inputted information may be stored in the MM DB 90. One option is to provide two web interfaces, one for administrators and another for users, for inputting new content. In another embodiment, new information may be uploaded through USSD text input. If text input is not possible, then there may be some cases where at least part of the new content can be inputted through a normal USSD menu selection, as shown in FIG. 6. New content may also be uploaded through SMS.

Figure 7:
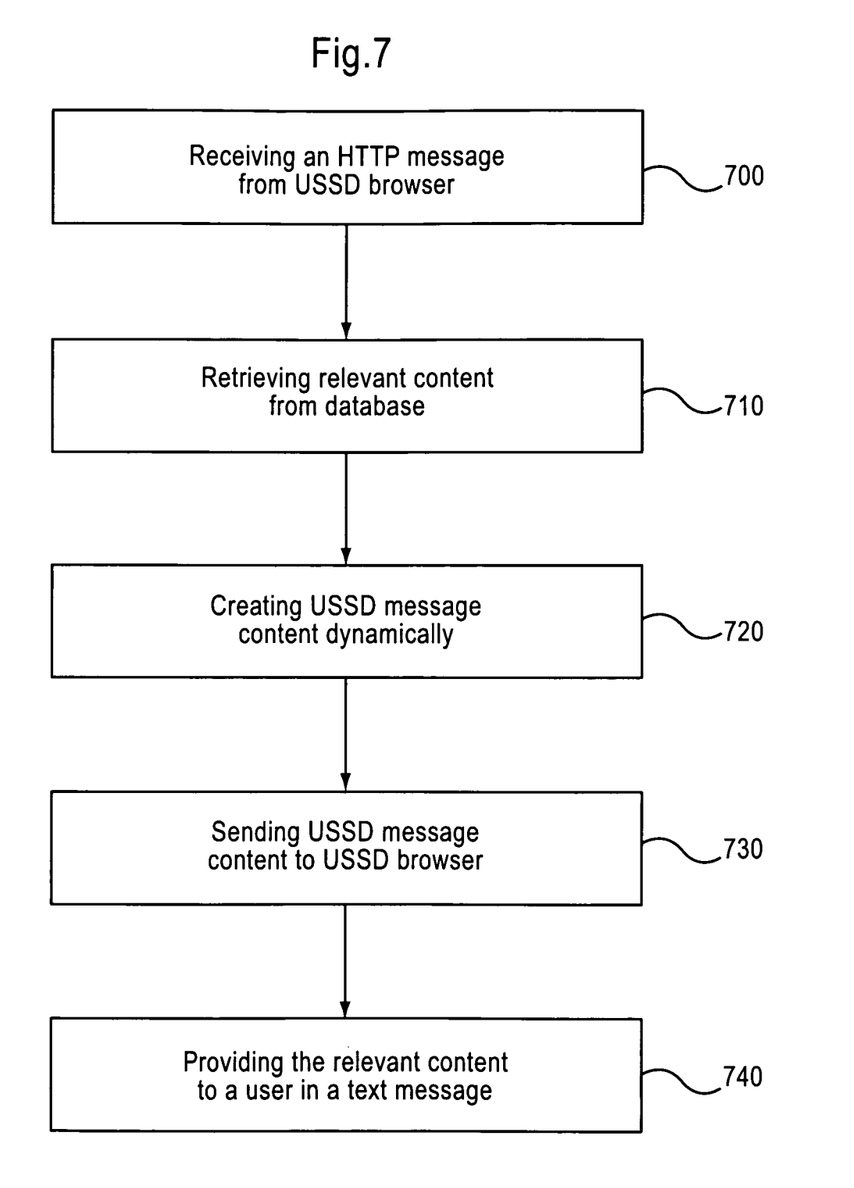
FIG. 7 illustrates a flow chart of a method according to an embodiment of the invention.

In view of the above, embodiments of the invention include a method for providing a service to a user via USSD, as illustrated in FIG. 7. The method includes receiving an HTTP message from a USSD browser 700, retrieving relevant content from a database upon receiving the HTTP message 710 and creating a USSD message content based on a set of parameters 720. The method further includes sending the USSD message content to the USSD browser 730, and providing the relevant content, such as the contact information of a supplier, to a user terminal in a text message 740. The method may further include storing user information to the database. Further, according to one example of the invention, dynamic creation of the message refers to automatic creation of the message, when needed, without the necessity of user or administrator intervention.

According to one example of the invention, the set of parameters used to generate the message content may include MSISDN, type of USSD request, end user answer, USSD session ID, user language and/or location. Additionally, in one example of the invention, the USSD message content is sent to the USSD browser in an HTTP response body. The text message sent to the user terminal may be an SMS message, and may be sent via an SMS GW. Additionally, in one embodiment, the database may be configured to store information regarding, for example, goods and services offered in a tree structure.

Figure 8:
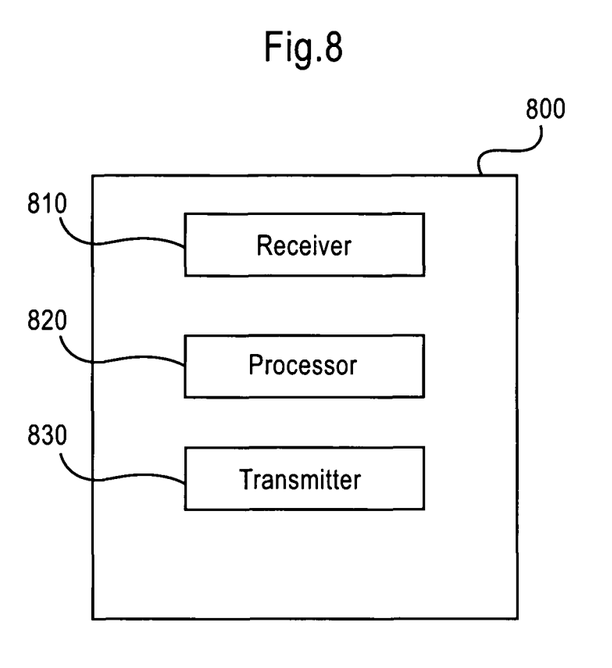
FIG. 8 illustrates a block diagram of an apparatus according to an embodiment of the invention.

In another embodiment of the invention, as illustrated in FIG. 8, an apparatus 800 for providing a service to a user via USSD is provided. The apparatus 800 includes a receiver 810 configured to receive an HTTP message from a USSD browser, a processor 820 configured to retrieve relevant content from a database upon receiving the HTTP message and to create a USSD message content based on a set of parameters. The apparatus further includes a transmitter 830 configured to send the USSD message content to the USSD browser, and to provide the relevant content, such as the contact information of a supplier, to a user terminal in a text message. The processor 820 may be further configured to store user information to the database.

In practice, a user desiring to access certain content on the MM server and/or the MM database may be charged for receiving the service. For example, once the user has chosen the desired content, the user may be asked whether they are willing to pay x cents to receive an SMS with the content. Additionally, the user wishing to upload content may be charged for the uploading of the content. Alternatively, external sponsors, such as consumer companies, may pay for the service in order to provide content to possible customers. The options described above may also be combined.

A USSD browser can utilize different elements when generating content for the end user terminal. For example, the content can be fetched from a web page using HTTP protocol. USSD-to-HTTP gateways are also available, which transform USSD protocol to HTTP protocol and the USSD menus as well as the content is generated on the HTTP server. This allows the service provider to generate dynamic content in a similar manner as regular web services do today.

One method for transferring USSD protocol to HTTP is for the USSD-to-HTTP gateway to make a HTTP request to some static uniform resource identifier (URI) where the selected menu entry as well as the session information is included in the HTTP GET parameters. An example of such a URI is: http://ussd.application.com/service?answer=1&session=eroi3432uoi4590weio4&MSISDN=35850123456. In this example, the answer that the user has given is "1." The URI also includes the session ID as well as the MSISDN number of the user. Since the HTTP request URI is created in this way, the HTTP server also needs to maintain the state where the user is currently in the menu structure.

Since the URI only included a session ID and just the last answer given by the user, the HTTP server would have to maintain all the previous entries of the user in order to know where in the menu tree the user currently is.

As a result, it is common for a USSD-to-HTTP gateway to operate in a way that the USSD session is duplicated on the HTTP server side. However, duplicating the session information on the HTTP server is not necessary. Rather, the USSD system may only maintain the session information, such as the current location of the user within the menu structure. Therefore, according to an embodiment of the invention, when USSD protocol is transferred to be used over HTTP protocol, it is not necessary to maintain the session information in the HTTP server as well. Duplicating the state makes scaling of the service more difficult, and also makes the service development on the HTTP side more cumbersome.

For a mass market service, the advantage of statelessness is very significant. The performance increase can easily be thousand fold or more. Also, telecommunications systems have been designed to handle large amounts of state information, whereas traditional web systems do not do that very well. Representational State Transfer (REST) principles have been used in design of the HTTP protocol and may also be applied in the USSD protocol.

Thus, according to one embodiment of the invention, when transferring the protocol from USSD to HTTP the USSD-to-HTTP gateway should indicate the service menu path the user has taken in the URI of the HTTP request. This is to avoid expensive duplicating of session states on the internet side.

Examples of the present invention provide that so called RESTful methods may be used when implementing a USSD-to-HTTP gateway. This means that the state in the service is stored on the client side, which may be the USSD Browser application. The state may be conveyed, for example, in the URI of the HTTP request. Tables 1-3 illustrate an example showing the HTTP protocol flow (requests and responses) and the URIs that the USSD-to-HTTP gateway request while the user is browsing through the menu of the service.

First, as shown in Table 1, the user starts the USSD session and the start menu is displayed to the user.

TABLE 1

GET http://ussd.application.com/service?msisdn=358501234567
HTTP/1.1
Content-Type: text/ussd
200 OK
Content-Type: text/ussd; charset=utf-8
Content-Length: 37
1. Sports
2. News
3. Weather
4. Exit The user then selects the "Sports" section, as shown in the URI of Table 2.

TABLE 2

GET http://ussd.application.com/service/1?msisdn=358501234567
HTTP/1.1
Content-Type: text/ussd
200 OK
Content-Type: text/ussd; charset=utf-8
Content-Length: 46
1. Footbal
2. Baseball
3. Formula One
4. Back Then the user selects the "Formula One" section, as shown in Table 3.

TABLE 3

GET http://ussd.application.com/service/1/3?msisdn=358501234567
HTTP/1.1
Content-Type: text/ussd
200 OK
Content-Type: text/ussd; charset=utf-8
Content-Length: 67
1. News
2. Results
3. Standings
4. Back Now, as can be seen from the URI illustrated in Table 3, the entries are presented in the path of the URI. The path to the "Formula One" section is "/service/1/3." Based on this URI, the HTTP server knows that the user has first selected number "1" and then number "3." Hence, the HTTP server does not need to maintain any session information since that is already done by the USSD Browser application. This provides huge advantage in terms of scalability. Also, embodiments of the invention enable the use of HTTP caching, which also provides a significant effect on the service performance.

In the examples discussed above, the user's MSISDN number is included as an attribute in the URI. Other parameters, such as location or the currently used home location register (HLR) could also be included as parameters. The MSISDN could also be included in the URI. For example, URI/050123456/1/2 would contain a resource (i.e., a menu) specific to user with MSISDN number 050123456.

Figure 9:
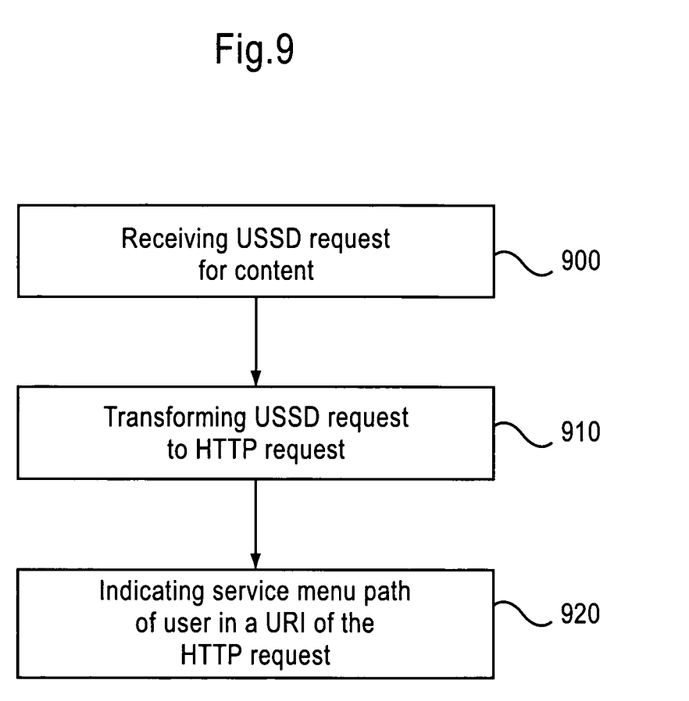
FIG. 9 illustrates a flow chart of a method according to an embodiment of the invention.

Therefore, embodiments of the invention provide a method for transferring USSD protocol to HTTP protocol, as illustrated in FIG. 9. The method includes receiving 900 a USSD request for content from a user of a USSD browser, transforming 910 the USSD request to an HTTP request, and indicating 920 the service menu path the user has taken in the URI of the HTTP request.

Figure 10:
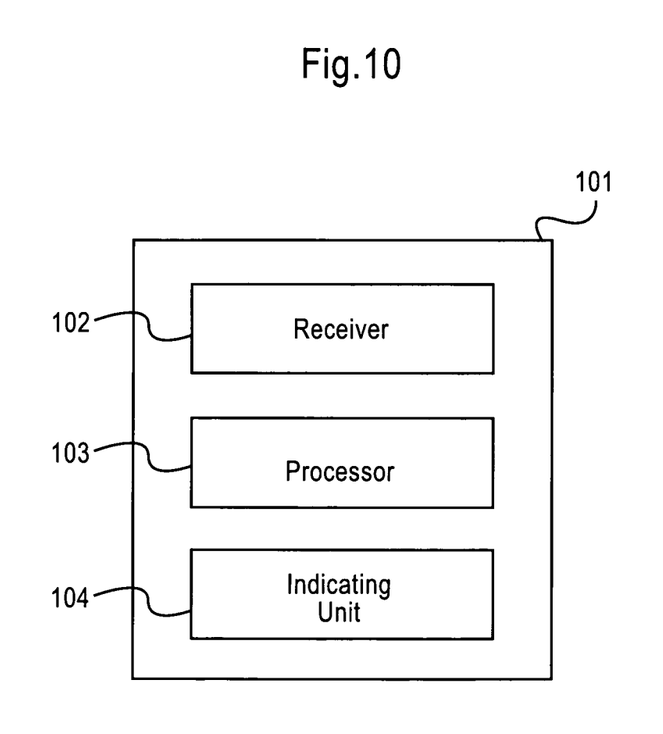
FIG. 10 illustrates a block diagram of an apparatus according to an embodiment of the invention.

In another embodiment of the invention, as illustrated in FIG. 10, an apparatus 101 for transferring USSD protocol to HTTP protocol. The apparatus includes a receiver 102 configured to receive a USSD request for content from a user of a USSD browser, a processor 103 configured to transform the USSD request to an HTTP request, and an indicating unit 104 configured to indicate the service menu path the user has taken in the URI of the HTTP request.

In accordance with an embodiment of the present invention, a computer program product embodied on a computer-readable medium may also be provided, encoding instructions for performing at least the methods described in FIGS. 7 and 9. The computer program product can be embodied on a computer readable medium. The computer program product can include, for example, encoded instructions for providing a service to a user via USSD. The computer program product can be implemented in hardware, software, or a hybrid implementation. The computer program product can be composed of modules that are in operative communication with one another, and which are designed to pass information or instructions to a communications device such as a user equipment or network node. The computer program product can be configured to operate on a general purpose computer or an application specific integrated circuit (ASIC).

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:
1. A method comprising:
receiving a hypertext transfer protocol (HTTP) message from an unstructured supplementary service data (USSD) server;
retrieving content comprising user information from a database upon receiving the HTTP message;
creating a USSD message content based on a set of parameters received in the HTTP message and based on the retrieved content;
sending the USSD message content to the USSD server;

sending a first USSD menu comprising a plurality of selection options to the USSD server based on the user information; and sending a second USSD menu comprising a plurality of selection options to the USSD server based on the user information and a user answer to the first USSD menu.

2. The method according to claim 1, wherein the set of parameters comprises at least one of Mobile Subscriber Integrated Services Digital Network Number (MSISDN), type of USSD request, end user answer, USSD session ID, user language, and location.

3. The method according to claim 1, wherein the sending of the message content comprises sending the message content in an HTTP response body.

4. The method according to claim 1, further comprising storing user information in the database.

5. The method according to 1, wherein the database is configured to store information in a logical tree structure.

6. The method according to claim 1, further comprising providing the content to a user terminal in a text message.

7. The method according to claim 6, wherein the text message comprises a short message service (SMS) message.

8. The method according to claim 7, wherein the providing comprises providing the content to a user terminal in a text message via an SMS gateway.

9. The method according to claim 1, wherein the content comprises contact information of a supplier.

10. An apparatus comprising:
a receiver configured to receive a hypertext transfer protocol (HTTP) message from an unstructured supplementary service data (USSD) server;
a processor configured to retrieve content comprising user information from a database upon receiving the HTTP message, and to create an USSD message content based on a set of parameters received in the HTTP message and based on the retrieved content; and
a transmitter configured to send the USSD message content to the USSD server, send a first USSD menu comprising a plurality of selection options to the USSD server based on the user information, and send a second USSD menu comprising a plurality of selection options to the USSD server based on the user information and a user answer to the first USSD menu.

11. The apparatus according to claim 10, wherein the set of parameters comprises at least one of Mobile Subscriber Integrated Services Digital Network Number (MSISDN), type of USSD request, end user answer, USSD session ID, user language, and location.

12. The apparatus according to claim 10, wherein the USSD message content is sent in an HTTP response body.

13. The apparatus according to claim 10, wherein the processor is further configured to store user information in the database.

14. The apparatus according to claim 10, wherein the database is configured to store information in a logical tree structure.

15. The method according to claim 10, wherein the transmitter is further configured to provide the content to a user terminal in a text message.

16. The apparatus according to claim 15, wherein the text message comprises a short message service (SMS) message.

17. The apparatus according to claim 16, wherein the content is provided to a user terminal in a text message via an SMS gateway.

18. The apparatus according to claim 10, wherein the content comprises contact information of a supplier.

19. The apparatus according to claim 10, wherein the apparatus comprises a web server.

20. A method comprising:
receiving an unstructured supplementary service data (USSD) request for content from a user of a USSD server;
transforming the USSD request to a hypertext transfer protocol (HTTP) request; and
indicating a service menu path the user has taken in a uniform resource identifier (URI) of the HTTP request,
wherein the service menu path comprises a plurality of selections made by the user.

21. An apparatus comprising:
a receiver configured to receive an unstructured supplementary service data (USSD) request for content from a user of a USSD server;
a processor configured to transform the USSD request to a hypertext transfer protocol (HTTP) request; and
an indicating unit configured to indicate a service menu path the user has taken in a uniform resource identifier (URI) of the HTTP request,
wherein the service menu path comprises a plurality of selections made by the user.

22. The apparatus according to claim 21, wherein the apparatus comprises a USSD-to-HTTP gateway.

23. A computer program, embodied on a non-transitory computer readable medium, the computer program configured to control a processor to perform a method comprising:
receiving a hypertext transfer protocol (HTTP) message from an unstructured supplementary service data (USSD) server;
retrieving content comprising user information from a database upon receiving the HTTP message;
creating a USSD message content based on a set of parameters received in the HTTP message and based on the retrieved content;
sending the USSD message content to the USSD server;
sending a first USSD menu comprising a plurality of selection options to the USSD server based on the user information; and
sending a second USSD menu comprising a plurality of selection options to the USSD server based on the user information and a user answer to the first USSD menu.

24. The computer program according to claim 23, wherein the method further comprises:
providing the content to a user terminal in a text message.

25. A computer program, embodied on a non-transitory computer readable medium, the computer program configured to control a processor to perform a method comprising:
receiving an unstructured supplementary service data (USSD) request for content from a user of a USSD server;
transforming the USSD request to a hypertext transfer protocol (HTTP) request; and
indicating a service menu path the user has taken in a uniform resource identifier (URI) of the HTTP request,
wherein the service menu path comprises a plurality of selections made by the user.

26. An apparatus comprising:
receiving means for receiving a hypertext transfer protocol (HTTP) message from an unstructured supplementary service data (USSD) server;
retrieving means for retrieving content comprising user information from a database upon receiving the HTTP message;
creating means for creating a USSD message content based on a set of parameters received in the HTTP message and based on the retrieved content;

a first sending means for sending the USSD message content to the USSD server;

a second sending means for sending a first USSD menu comprising a plurality of selection options to the USSD server based on the user information; and a third sending means for sending a second USSD menu comprising a plurality of selection options to the USSD server based on the user information and a user answer to the first USSD menu.

27. The apparatus according to claim 26, further comprising providing means for providing the content to a user terminal in a text message.

28. An apparatus comprising:

receiving means for receiving an unstructured supplementary service data (USSD) request for content from a user of a USSD server;

transforming means for transforming the USSD request to a hypertext transfer protocol (HTTP) request; and indicating means for indicating a service menu path the user has taken in a uniform resource identifier (URI) of the HTTP request, wherein the service menu path comprises a plurality of selections made by the user.

\* \* \* \* \*